(12) United States Patent
Cornew

(10) Patent No.: US 10,661,645 B2
(45) Date of Patent: May 26, 2020

(54) VEHICLE COVERING APPARATUS

(71) Applicant: Daniel Cornew, Portola Valley, CA (US)

(72) Inventor: Daniel Cornew, Portola Valley, CA (US)

(73) Assignee: Daniel Cornew, Portola Valley, CA (US)

(*) Notice: Subject to any disclaimer, the term of this patent is extended or adjusted under 35 U.S.C. 154(b) by 155 days.

(21) Appl. No.: 15/912,315

(22) Filed: Mar. 5, 2018

(65) Prior Publication Data

US 2019/0077241 A1    Mar. 14, 2019

Related U.S. Application Data

(62) Division of application No. 13/970,503, filed on Aug. 19, 2013, now Pat. No. 9,908,393.

(51) Int. Cl.
*B60J 11/00* (2006.01)
*E04H 6/04* (2006.01)
*B60P 7/08* (2006.01)

(52) U.S. Cl.
CPC .............. *B60J 11/00* (2013.01); *E04H 6/04* (2013.01); *B60P 7/0876* (2013.01)

(58) Field of Classification Search
CPC ... B60J 11/00; B60J 11/04; E04H 6/04; B60P 7/0876; B60P 7/00; B60P 7/02; A45B 23/00; A45B 2023/0012; A45B 2023/0037; A45B 17/00
See application file for complete search history.

(56) References Cited

U.S. PATENT DOCUMENTS

| | | | | |
|---|---|---|---|---|
| 508,418 A * | 11/1893 | Heaney | ............ | A01K 97/10 248/514 |
| 1,759,628 A * | 5/1930 | Pellegrino | ............ | B60J 11/00 135/90 |
| 5,015,029 A * | 5/1991 | Kramer | ............ | B60J 11/00 135/88.05 |
| 5,261,435 A * | 11/1993 | Stanley | ............ | E04H 6/04 135/90 |
| 5,501,502 A * | 3/1996 | Wang | ............ | B60J 11/00 135/88.05 |
| 5,850,843 A * | 12/1998 | Mahood | ............ | A45B 23/00 135/88.06 |
| 5,960,806 A * | 10/1999 | Steiner | ............ | A45B 23/00 135/20.1 |
| 6,220,261 B1 * | 4/2001 | Glatz | ............ | A45B 17/00 135/20.1 |
| 6,662,815 B2 * | 12/2003 | Tung | ............ | A45B 17/00 135/20.1 |
| 6,761,180 B1 * | 7/2004 | Lai | ............ | A45B 17/00 135/20.1 |

(Continued)

*Primary Examiner* — Michael E Gallion
(74) *Attorney, Agent, or Firm* — Womble Bond Dickinson (US) LLP

(57) ABSTRACT

An apparatus for raising and lowering a vehicle cover is provided. The apparatus includes a flexible member having a first end and a second end, the flexible member configured to flex so that, with the first end positioned adjacent to a vehicle and the second and positioned generally higher than the vehicle, the second end raises the vehicle cover up from the vehicle and lowers the vehicle cover down towards the vehicle. The second end of the flexible member is configured to retain the vehicle cover.

9 Claims, 13 Drawing Sheets

(56) References Cited

U.S. PATENT DOCUMENTS

| | | | | |
|---|---|---|---|---|
| D653,845 S | * | 2/2012 | Li | D3/5 |
| 9,127,476 B2 | * | 9/2015 | Cornew | E04H 15/28 |
| 9,232,836 B1 | * | 1/2016 | Zaccaro | E02D 5/80 |
| 9,908,393 B2 | * | 3/2018 | Cornew | B60J 11/00 |
| 2002/0083969 A1 | * | 7/2002 | Tung | A45B 23/00 135/90 |
| 2002/0149225 A1 | * | 10/2002 | Hornady | B60P 7/04 296/100.01 |
| 2004/0046161 A1 | * | 3/2004 | Payne | B60J 7/102 254/266 |
| 2005/0229956 A1 | * | 10/2005 | Merritt | A45B 17/00 135/20.1 |
| 2006/0254635 A1 | * | 11/2006 | Matheus | E04H 6/04 135/88.05 |
| 2008/0236640 A1 | * | 10/2008 | Huali | A45B 23/00 135/20.3 |
| 2012/0167932 A1 | * | 7/2012 | Banerjee | A45B 11/00 135/16 |
| 2014/0117296 A1 | * | 5/2014 | Shrader | B60P 7/0876 254/278 |

* cited by examiner

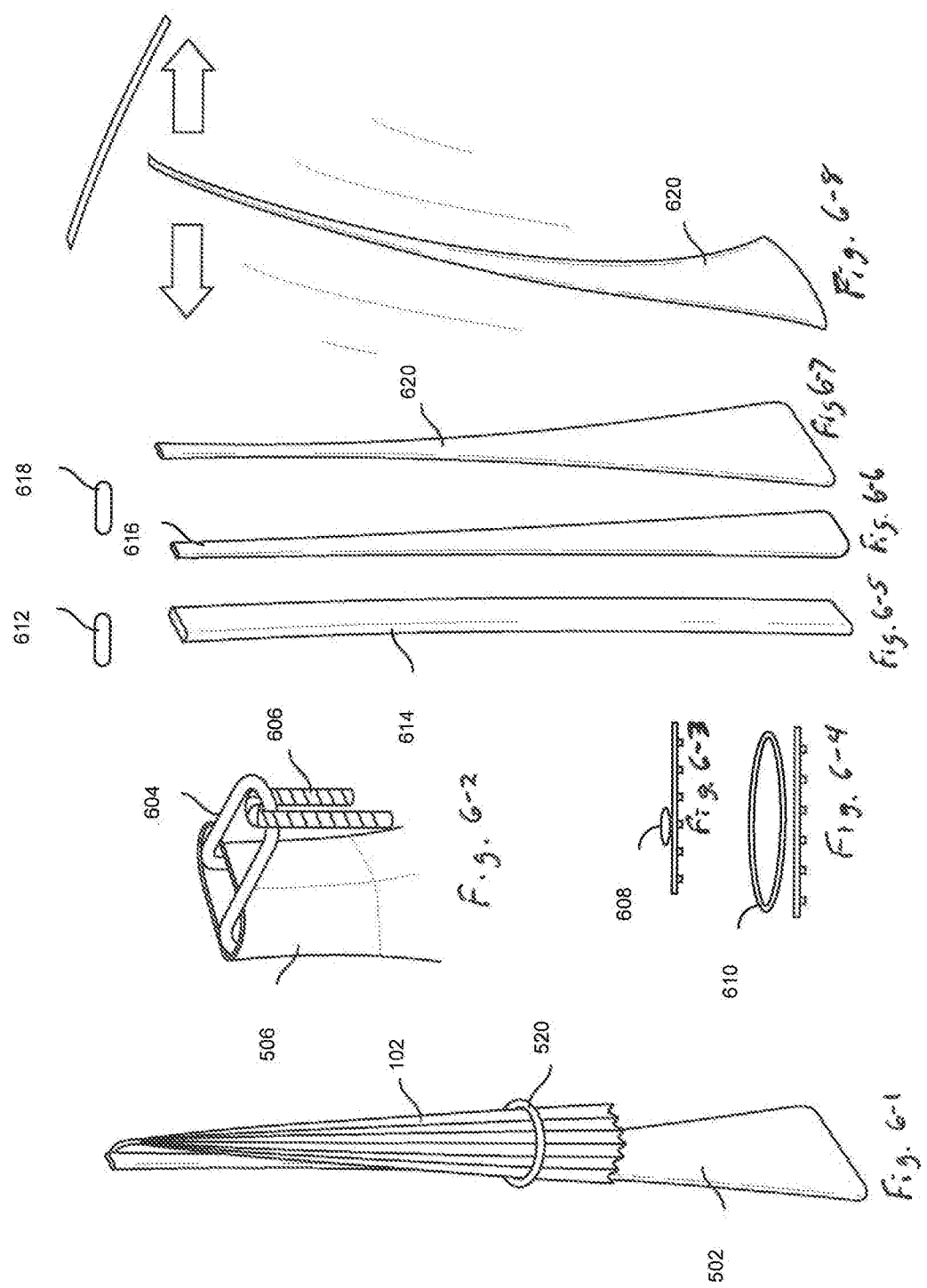

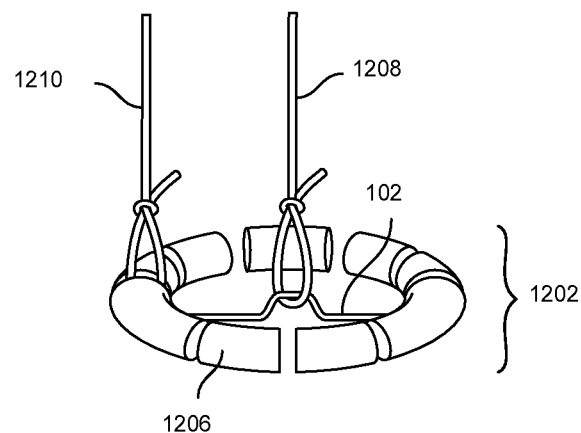
FIG. 12A
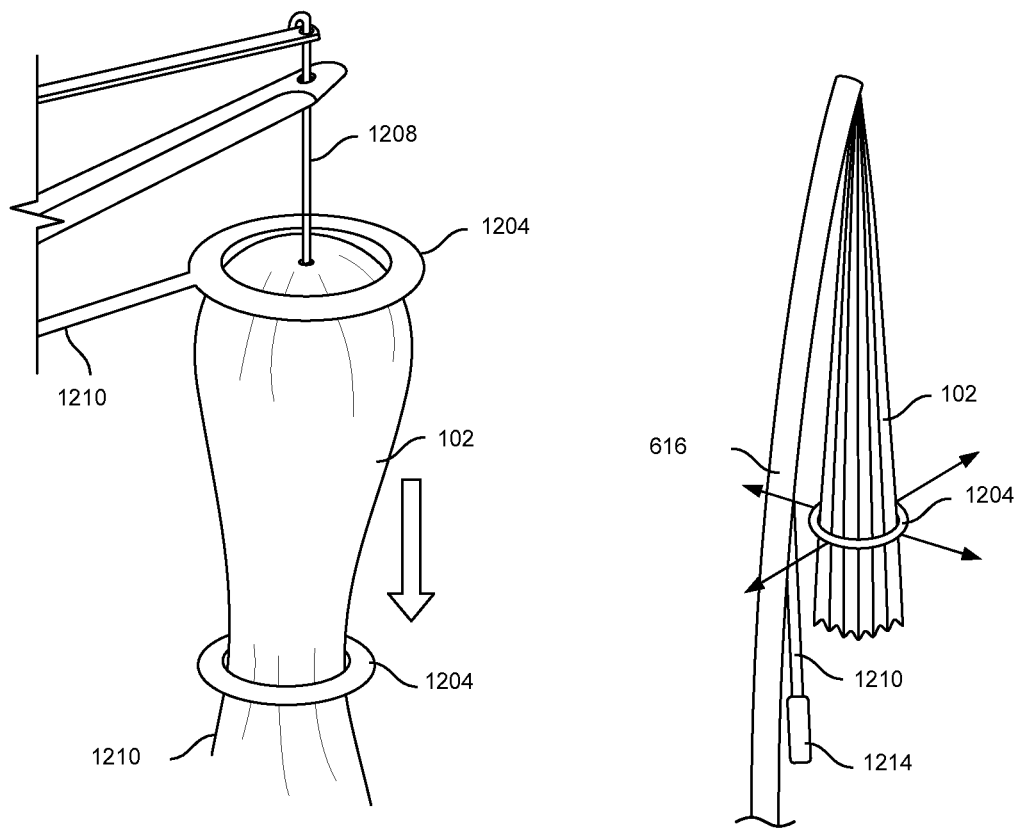
FIG. 12B
FIG. 12C

VEHICLE COVERING APPARATUS

BACKGROUND

Many people use car covers to protect their automobiles from the weather. A vehicle cover can protect a vehicle's paint from early fading and peeling as result from long sun exposure, and can protect a vehicle from early rusting by shedding some, most or all of the rainwater that falls on the vehicle during a storm. Yet, removing a vehicle cover from a vehicle and deploying a vehicle cover onto a vehicle are unwieldy operations. Once a vehicle cover is removed from the vehicle, there is a need for storage of the vehicle cover. Storing the vehicle cover in the vehicle trunk or elsewhere in the vehicle takes up needed vehicle space. Rolling up the vehicle cover and stowing it in a corner of a driveway is time-consuming and runs the risk that the vehicle cover will be run over by a vehicle, trampled, tripped over, blown away by wind, chewed on by an animal, etc. A vehicle cover stowed on the ground also gathers dirt, standing water, mud, etc. Unless the vehicle cover has been neatly rolled up, putting the vehicle cover back onto the vehicle can be time-consuming and frustrating. Therefore, there is a need in the art for a solution which overcomes the drawbacks described above.

SUMMARY

In some embodiments, a vehicle covering apparatus is provided. The apparatus includes a support member having a first end and a second end, the support member having a first position and a second position, wherein the second end is more displaced from a linear alignment with the first end when the support member is in the second position than when the support member is in the first position, and wherein the second end is farther from the first end when the support member is in the first position than when the support member is in the second position. The support member is configured to install with the first end of the support member adjacent to a vehicle, wherein the second end of the support member is generally centered over the vehicle when the support member is in the second position. The second end of the support member is configured to support a vehicle cover with the second end of the support member at a higher elevation than the vehicle cover. The support member is configured to lower the vehicle cover as the support member is operated from the first position to the second position, and to raise the vehicle cover as the support member is operated from the second position to the first position.

In some embodiments, an apparatus for raising and lowering a vehicle cover is provided. The apparatus includes a flexible member having a first end and a second end, the flexible member configured to flex so that, with the first end positioned adjacent to a vehicle and the second and positioned generally higher than the vehicle, the second end raises the vehicle cover up from the vehicle and lowers the vehicle cover down towards the vehicle. The second end of the flexible member is configured to retain the vehicle cover.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 6 is a perspective view of variations of a flexible member as used in the vehicle covering apparatus of FIG. 5.

FIG. 12A is a perspective view of an embodiment of a securing member, which can be applied to gather and secure portions of a vehicle cover in embodiments of the vehicle covering apparatus.

FIG. 12B is a perspective view of a further embodiment of the securing member, shown gathering and securing a vehicle cover.

FIG. 12C is a perspective view of the securing member of FIG. 12B, showing aspects of an operating feature.

DETAILED DESCRIPTION

A vehicle covering apparatus provides solutions to many of the problems described above. The vehicle covering apparatus raises a vehicle cover up from or off of a vehicle, and lowers the vehicle cover towards, down to or down onto a vehicle. Some versions of the vehicle covering apparatus secure, or even gather and secure, the vehicle cover. Various features and operating mechanisms described herein can be applied in various combinations to embodiments of the vehicle covering apparatus.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
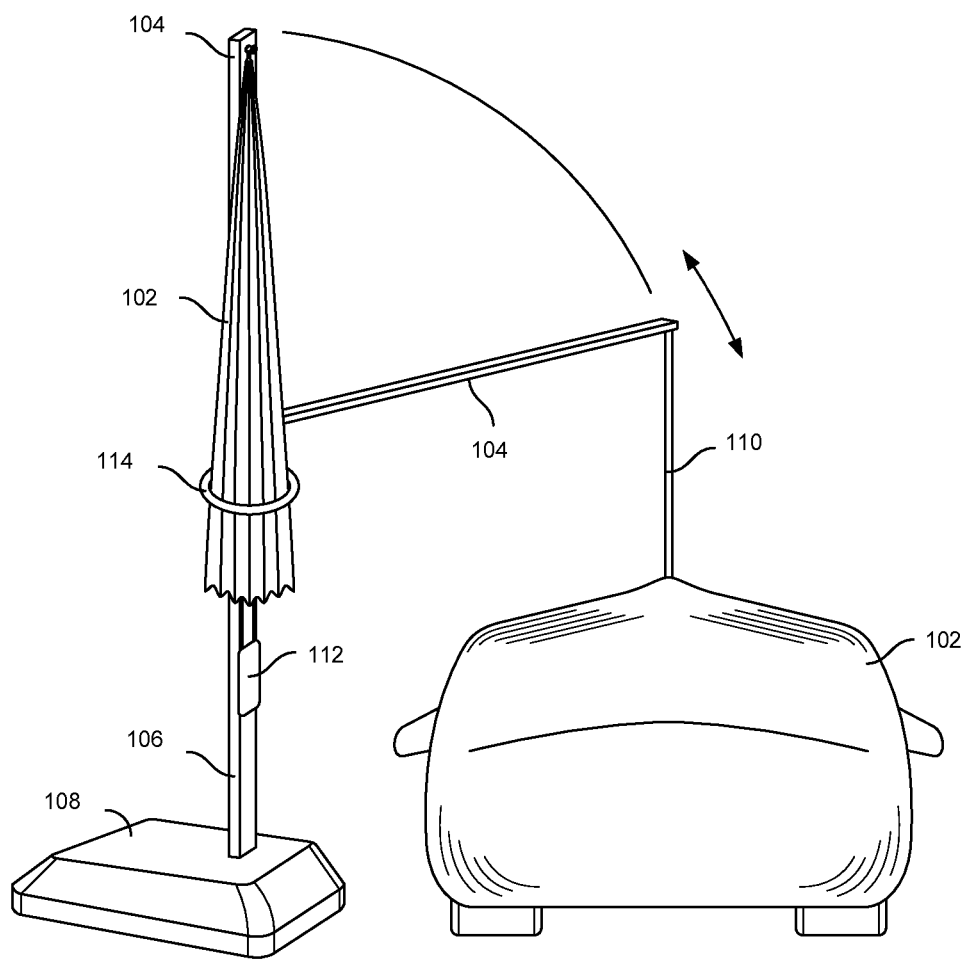
FIG. 1 is a perspective view of a vehicle covering apparatus in accordance with embodiments described herein.

FIG. 1 is a perspective view of a vehicle covering apparatus in accordance with embodiments described herein. A vehicle, in this illustration an automobile, is shown covered by a vehicle cover 102, in this illustration a car cover. An embodiment of the vehicle covering apparatus is shown in FIG. 1 as having two positions, with a two-headed arrow showing available motions of one end of a support member. In this embodiment, the support member includes a stationary member 106, affixed to a base 108, and a movable member 104, which is pivotably attached at one end to the stationary member 106. Other embodiments have fewer or additional members included in a support member.

Here, the support member represented by the movable member 104 and the stationary member 106 is depicted in a first position with the vehicle cover 102 lifted off the vehicle, and is depicted in a second position with the vehicle cover 102 covering the vehicle. The support member 104, 106 can move freely between the first position and the second position and vice versa. The support member 104, 106 lowers the vehicle cover as the support member is operated from the first position to the second position, and raises the vehicle cover as the support member is operated from the second position to the first position.

A first end of the support member 104, 106 is configured to install adjacent to the vehicle. In this example, the first end of the support member 104, 106 is a bottom end of the stationary member 106, and inserting the stationary member 106 into the base 108 anchors the stationary member 106. Placing the base next to the vehicle installs the first end of the support member 104, 106 adjacent to the vehicle. Other mechanisms for anchoring the first end of the support member 104, 106 could be employed, such as installing the first end into concrete, asphalt or the ground.

A second end of the support member 104, 106 is configured to support the vehicle cover with the second end of the support member at a higher elevation than the vehicle cover 102. In this example, the second end of the support member 104, 106 is a top end of the movable member 104, which attaches to an attachment region of the vehicle cover 102 by way of a cord 110. The cord 110 could be a string, a rope, a chain, an elastic member, a belt, or other flexible extension, as could other cords in this disclosure. The second end of the support member 104, 106 remains generally above the vehicle during operation, so that the second end of the support member 104, 106 can raise and lower the vehicle cover 102.

The second end of the support member 104, 106 is more displaced from a linear alignment with the first end of the support member 104, 106 when the support member is in the second position than when the support member is in the first position. In the embodiment shown in FIG. 1, this is so because the movable member 104 and stationary member 106 are approximately linearly aligned in the first position, and the movable member 104 is angularly rotated relative to the stationary member 106, in the second position. In further embodiments, the movable member 104 and stationary member 106 could be at an angle with one another in the first position, with this angle increasing during the transition to the second position.

The second end of the support member 104, 106 is farther from the first end of the support member 104, 106 when the support member is in the first position than when the support member is in the second position. In the embodiment shown in FIG. 1, this is so because the support member straightens out, or becomes less angular, in the transition from the second position to the first position. In further embodiments, the support member could retain an angular relationship between the movable member 104 and the stationary member 106 in the first position.

A handle 112 is shown alongside the stationary member 106 in FIG. 1. In various embodiments, pulling on the handle could raise the movable member 104, raise the vehicle cover 102, or pull on and lower a securing member 114, as will be further described below. In other embodiments, the securing member 114 could be attached to the stationary member 106 and fasten around a gathered vehicle cover 102, for example by use of hook and loop fasteners or snaps etc. In still further embodiments, a crank, an electric motor or other mechanism is employed to operate the movable member 104 relative to the stationary member 106 or operate variations of the support member. It should be appreciated that many and varied handles are available for use in this and other embodiments.

Figure 2:
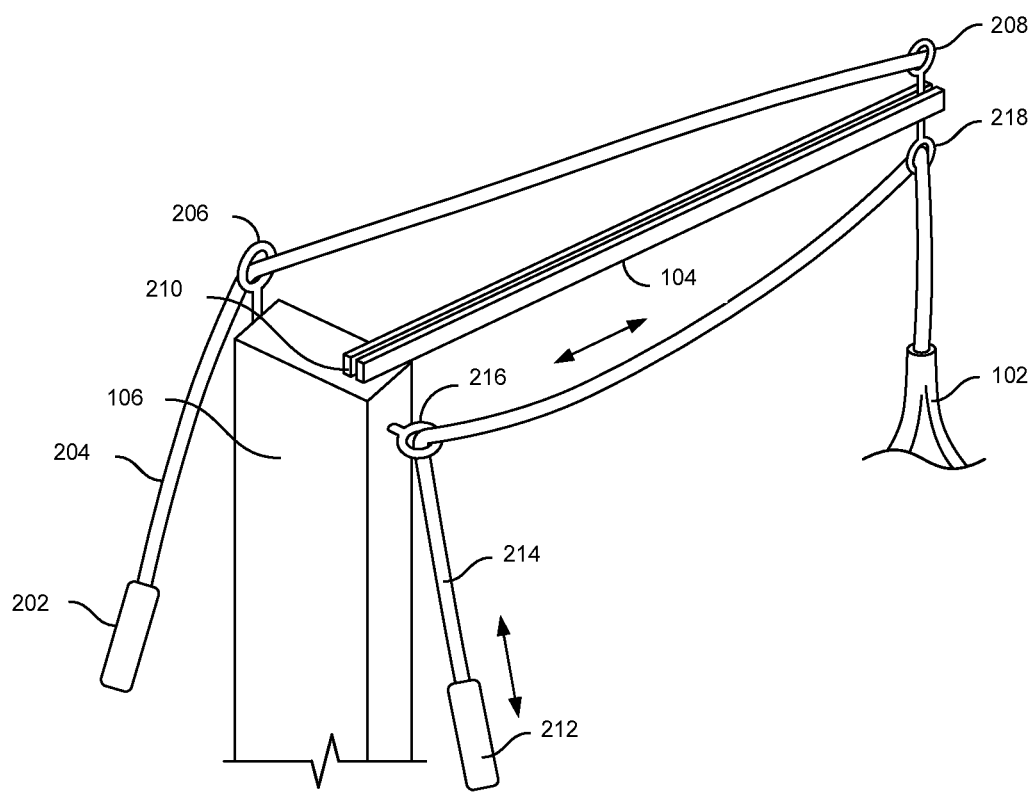
FIG. 2 is a close-up perspective view of operating features of one embodiment of the vehicle covering apparatus.

FIG. 2 is a close-up perspective view of operating features of one embodiment of the vehicle covering apparatus. A first end of the movable member 104 is attached at a pivot 210 to a second end of the stationary member 106. The pivot 210 could include a hinge, a bearing, a pin or other known mechanism allowing two members to pivot relative to one another. The second end of the movable member 104 has a first eyelet 208 on a top side of the movable member 104 and a second eyelet 218 on a bottom side of the movable member 104. A third eyelet 206 is located on a portion of the stationary member 106 so as to afford leverage on the second end of the movable number 104 relative to the pivot 210. A fourth eyelet 216 is located on a portion of the stationary member 106 so as to afford leverage in lifting the vehicle cover 102. In further embodiments, the eyelets could be replaced by other devices allowing securing or operation of other types of mechanisms for pivoting or raising or lowering the second end of the movable member 104 or raising or lowering a vehicle cover 102.

A first cord 204 slides through the third eyelet 206 and is attached to the first eyelet 208. Pulling, or otherwise applying tension to, the first cord 204, as by pulling on a handle 202 attached to the first cord 204, applies tension to the first eyelet 208, which lifts the second end of the movable member 104 and rotates the movable number 104 towards a more linear alignment with the stationary member 106. In further embodiments, tension could be applied to the first cord 204 by a crank or a motor, or other tensioning member. In still further embodiments, the cord 204 could be replaced by or augmented by a spring. In yet further embodiments, the movable member 104 could be operated by gears or one or more levers, or a counterweight.

A second cord 214 slide through the fourth eyelet 216 and the second eyelet 218, and is attached at an attachment region to the vehicle cover 102. Pulling, or otherwise applying tension to, the second cord 214, as by pulling on the handle 212 attached to the second cord 214, applies a lifting force to the vehicle cover 102. It is readily observed that the vehicle cover 102 can be lifted by either or both of the cords 204, 214, or by related mechanisms in further embodiments.

Figure 3:
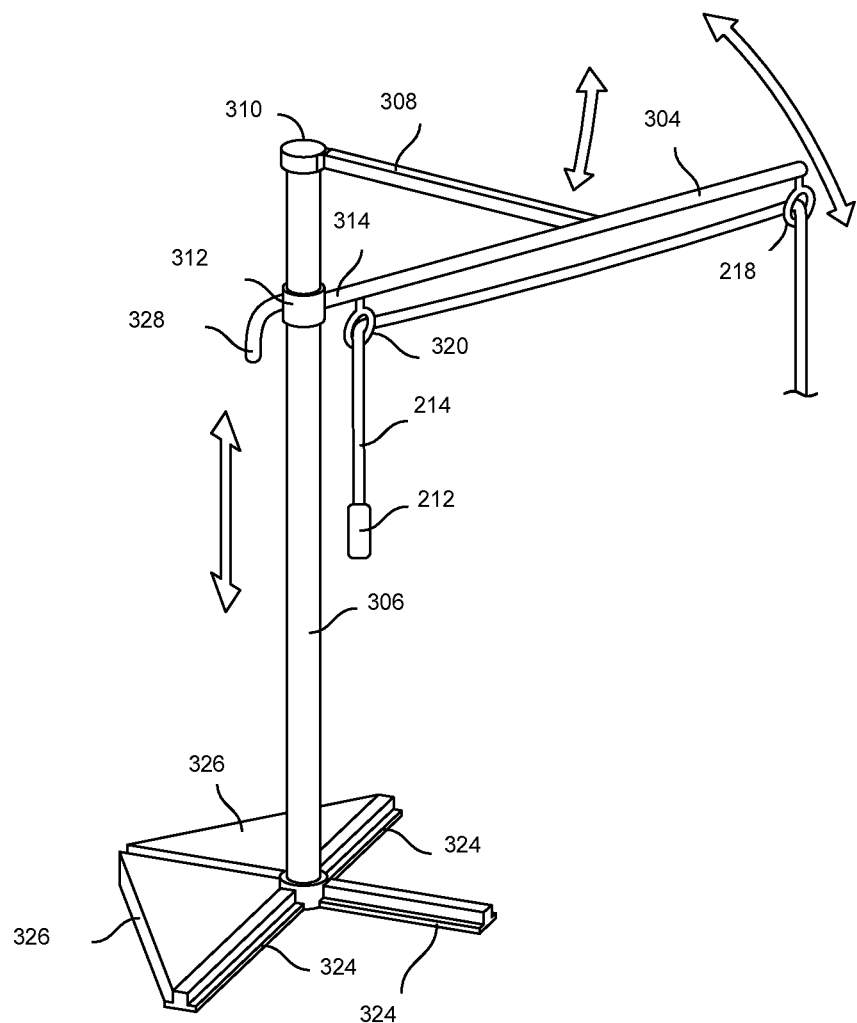
FIG. 3 is a perspective view of a further embodiment of the vehicle covering apparatus of FIG. 1.

FIG. 3 is a perspective view of a further embodiment of the vehicle covering apparatus of FIG. 1. In this embodiment, a first movable member 304 is slidably and pivotably attached to a stationary member 306. A second movable member 308 is pivotably attached to both the stationary member 306 and the first movable member 304. A cord 214 with a handle 212 raises and lowers a car cover in a manner similar to the second cord 214 of FIG. 2. The cord 214 passes through a loop 320, which could be an enlarged eyelet, and an eyelet 218, with the loop 320 attached to the first movable member 304 at a first end, and the eyelet 218 attached to the movable member 304 at a second end. It should be appreciated that extensions could be added to any of the members without changing the essential operation thereof.

In FIG. 3, the first movable member 304 has a sliding collar 312 attached to the first end of the first movable member 304. The sliding collar slides up and down on the stationary member 306, while the movable member 304 rotates relative to the sliding collar 312 at a pivot 314 attaching the movable member 304 to the sliding collar 312. The first movable member 304 pivots relative to the second movable member 308, which is pivotably attached to the first movable member 304 at a location between the first end and the second end of the movable member 304. The second movable member 308 is pivotably attached to the second end of the stationary member 306 at a pivot of an end cap 310. The end cap 310 is attached to the second end of the stationary member 306.

By grasping a handle 328 attached to the sliding collar 312, a user can push upward or downward on the sliding collar 312. Pushing upward on the sliding collar 312, as by the handle 328 or other mechanism in further embodiments, pushes upward on the first end of the first movable member 304, resulting in the first movable member 304 tilting away from the stationary member 306 and the second end of the first movable member 304 moving away from linear alignment with the first stationary member 306. Pushing downward on the sliding collar 312 pushes downward on the first end of the first movable member 304, resulting in the first movable member 304 tilting towards the stationary member 306 and the second end of the first movable member 304 moving towards linear alignment with the first stationary member 306. Thus, the car cover can be lifted by pushing downward on the sliding collar 312 or by applying tension to the cord 214. The car cover can be lowered by pushing upward on the sliding collar 312 or by decreasing tension on the cord 214, i.e. releasing the cord 214 from tension. FIG. 3 shows the support member 304, 308, 306 in a second position, as when the car cover is lowered. A first position, with the first movable member in a more upright stance, is readily envisioned.

The first end of the stationary member 306 is attached to a base that includes multiple horizontal members 324 extending perpendicularly from the first end of the stationary member 306. Weights 326 are fitted to the horizontal members 324 so as to provide a weighted base. In this embodiment, the weighted base has sufficient extent, i.e. the lengths of the horizontal members 324, and sufficient weight, i.e. the weight of the weights 326, so as to support the support member 304, 308, 306 in both the first position and the second position.

Figure 4:
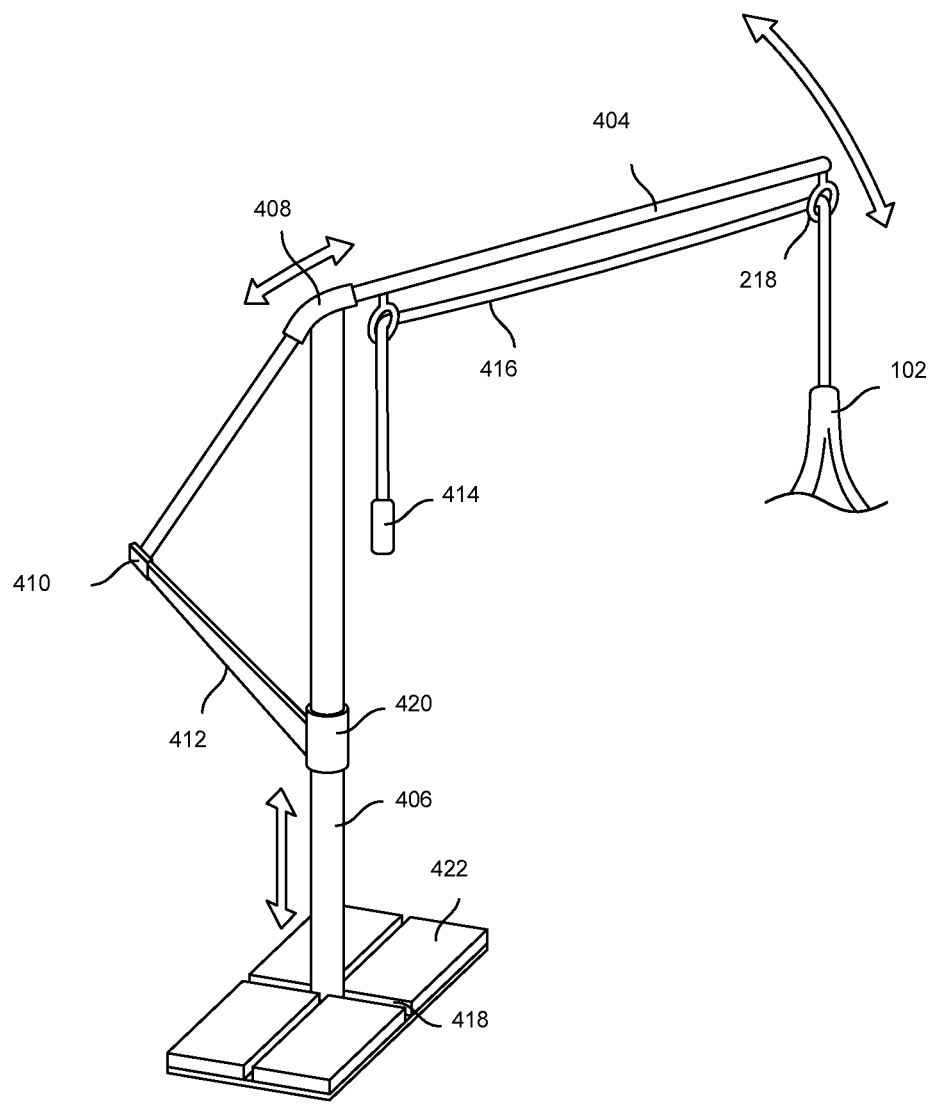
FIG. 4 is a perspective view of a further embodiment of the vehicle covering apparatus of FIG. 1.

FIG. 4 is a perspective view of a further embodiment of the vehicle covering apparatus of FIG. 1. As in the embodiments of FIGS. 1-3, this version has a generally upright stationary member 406, which is fixed at a first end to a base. This base has horizontal members 418 and weights 422. Here, a first movable member 404 pivots relative to the stationary member 406, and also slides relative to the stationary member 406. The first movable member 404 slides through a pivoting slide collar 408, which pivots at the second end of the stationary member 406. The first movable member 404 pivots at a pivot 410 attached to a second end of a second movable member 412. The first end of the first movable member 404 is attached to the pivot 410 and thereby to the second end of the second movable member 412. The second end of the first movable member 404 acts as the second end of the support member represented by the first movable member 404, the second movable member 412 and the stationary member 406. The first end of the second movable member 412 slides upward and downward on the stationary member 406, using a slide collar 420. The vehicle covering apparatus is shown in FIG. 4 approximately midway between a first position and a second position. Raising the slide collar 420 extends the second end of the first movable member 404 further from the pivoting slide collar 408 and rotates the first movable member 404 further away from a linear alignment with the stationary member 406. Lowering the slide collar 420 retracts the second end of the first movable member 404 closer to the pivoting slide collar 408 and rotates the first movable member 404 closer to linear alignment with the stationary member 406. In the embodiment shown, the first movable member 404 has a gentle curvature, while further embodiments could employ a straight section in the first movable member 404.

A handle 414 operates a cord 416 so as to raise and lower the vehicle cover 102 in a manner similar to that of other embodiments. The cord 416 passes through one or more eyelets 218, and is attached at one end to the vehicle cover 102. The vehicle cover 102 can thus be raised by lowering the slide collar 420 or applying tension to the cord 416, or both. It should be appreciated that various mechanisms employing gears, motors, springs etc. could be applied towards the above-described tasks.

Figure 5:
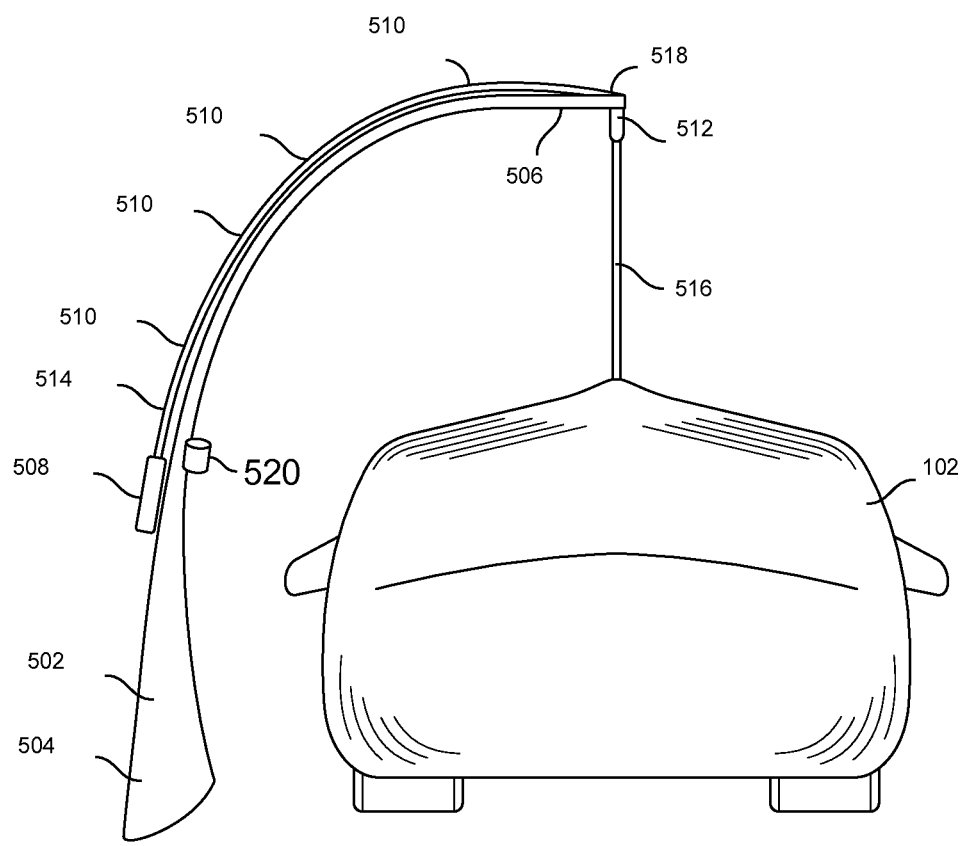
FIG. 5 is a perspective view of a further embodiment of the vehicle covering apparatus of FIG. 1.

FIG. 5 is a perspective view of a further embodiment of the vehicle covering apparatus of FIG. 1. This embodiment features a flexible member 502 acting as the support member, so that no hinges, pivot pins or other mechanisms allowing one member to pivot relative to another member are needed in the support member itself. The first end 504 of the flexible member 502 is positioned adjacent to the vehicle. For example, the first end 504 could be buried in the ground or in concrete, or could use a base of some sort. The second end 506 of the flexible member 502 is positioned generally higher than the vehicle, so that the second end 506 can raise the vehicle cover up from the vehicle and lower the vehicle cover down towards the vehicle. The second end 506 of the flexible member 502 has an attachment mechanism configured to attach to the vehicle cover. In this example, the attachment mechanism includes a cord 516 attached to an attachment region of the vehicle cover 102. The vehicle covering apparatus is shown in FIG. 5 in a second position. The flexible member 502 curves more as the second end 506 lowers the vehicle cover down towards the vehicle, and curves less as the second end 506 raises the vehicle cover up from the vehicle. Thus, the second position evinces a greater curvature of the flexible member 502 than does the first position.

Embodiments of the vehicle covering apparatus employing a flexible member as the support member, as shown in FIGS. 5-8, share some characteristics with the vehicle covering apparatus of FIG. 1. Particularly, both types have a first position and a second position, and the support member can lower the vehicle cover ks the support member is operated from the first position to the second position. The support member can raise the vehicle cover as the support member is operated from the second position to the first position. The second end of the support member is more displaced from a linear alignment with the first end of the support member when the support member is in the second position than when the support member is in the first position. The second end of the support member is farther from the first end of the support member when the support member is in the first position than when the support member is in the second position. The general installation and positioning of the first and second ends relative to the vehicle are similar as well.

Continuing with the embodiment shown in FIG. 5, a cord 514 has a handle 508 at a first end, and passes through eyelets 510 attached to the flexible member 502. In one embodiment, the cord 514 is attached to an eyelet 518 or other securing device at the second end 506 of the flexible member 502. Pulling on the handle 508, or otherwise applying tension to the cord 514 as by a crank or a motor, acts to decrease the curvature of the flexible member 502 and move the vehicle covering apparatus of FIG. 5 from the second position towards or to the first position.

In a further embodiment, the cord 514 passes through an eyelet 518 and is attached to the cord 516. For example, the cord 514 and the cord 516 could be segments of a single cord, or could be tied together. Pulling on the handle 508, or otherwise applying tension to the cord 514, raises the vehicle cover 102 by decreasing the amount of cord 516 between an eyelet 512 and an attachment region of the vehicle cover 102, or by decreasing the curvature of the flexible member 502, or both. For example, the car cover could be drawn upwards towards the eyelet 512, and upon reaching the eyelet 512, the curvature of the flexible member 502 could decrease. Or, the curvature of the flexible member 502 could decrease first, followed by decreasing the amount of cord 516 between the eyelet 512 and the attachment region of the vehicle cover 102. These actions could even be simultaneous. A securing member 520 is attached to the flexible member 502, for securing the vehicle cover 102 in a manner similar to that previously described.

FIG. 6 is a perspective view of variations of a flexible member 502 as used in the vehicle covering apparatus of FIG. 5. A flexible member 502 is shown in a first position, in which the flexible member 502 is generally upright and linearly aligned. In variations, the flexible member 502 could have some curvature in the first position, although not as much as in the second position. The vehicle cover 102 is secured by the securing member 520.

In various embodiments, the flexible member 502 can have an oval cross-section 610 at the first end or base end, and a smaller oval cross-section 608 at the second end or top end, or could have a rounded rectangular cross-section 612, or an elliptical cross-section 618, etc. One embodiment of a flexible member 614 has a constant width and thickness from bottom to top or from one end to the other end. One embodiment of a flexible member 616 has a generally linear taper from a larger first end to a smaller second end. One embodiment of a flexible member 620 has a concave taper from a larger first end to a smaller second end. A convex taper could also be used. The flexible member 620 is shown twice, once in a first position, and once flexing, i.e., bending back and forth. Selection of whether or not to apply a taper to a flexible member, and what type of taper to apply, may be interrelated with material choice and overall dimensions of the flexible member, in that all of these criteria affect the flexing of the device.

In a detail view, an eyelet 604 is shown at the second end 506 of a flexible member. The eyelet allows a cord 606 to pass through. In this embodiment, the flexible member is hollow, although further embodiments can be solid, composite, or built up. The flexible member could include a flat spring or even a leaf spring, in various embodiments.

One characteristic that the embodiments of FIGS. 5 and 6 share is that the flexible member curves more as the second end lowers the vehicle cover down towards the vehicle, and curves last as the second end raises the vehicle cover up from the vehicle. This is so because the embodiments of FIGS. 5 and 6 have generally a single curve with a single direction of curvature from the first end to the second end, and this single curve is generally a circular or elliptical arc. The single curve is consistently concave when viewed from the vehicle side of the flexible member, in the embodiments of FIGS. 5 and 6. This single curve could be modified to increase or decrease amount of curvature in sections in variations. In further variations, however, the flexible member could have an S curve, a wavy curve, or straight sections joined by one or more curves, and so on.

Figure 7A:
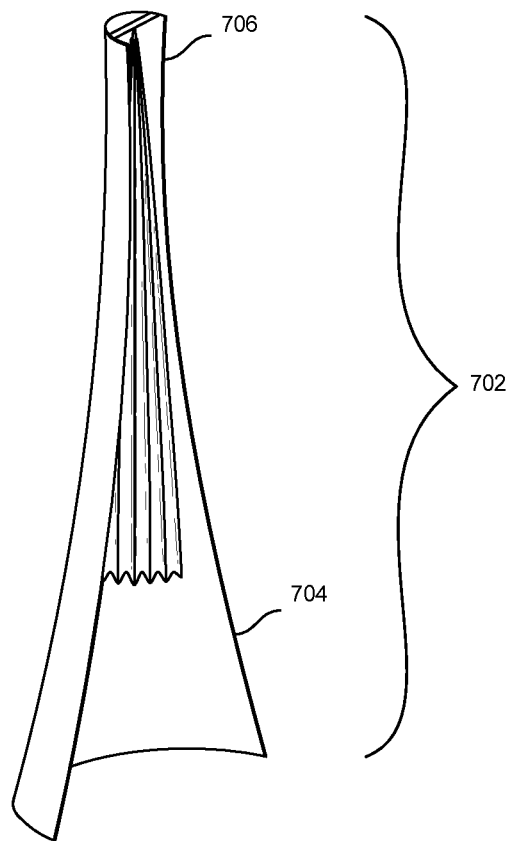
FIG. 7A is a perspective view of a further variation of the flexible member as used in the vehicle covering apparatus of FIG. 5.

FIG. 7A is a perspective view of a further variation of the flexible member 502 as used in the vehicle covering apparatus of FIG. 5. Here, the flexible member 702 acts as a support member having a first end 704 and a second and 706. The flexible member 702 has a thin shell with compound curvature, and could be formed using spring steel, plastic, fiberglass, composite material, or other material having the capability of flexing and returning repeatedly, as could other variations of flexible members. As shown, a front side of the flexible member 702 has a concave curvature, and the main body of the flexible member 702 has a concave taper from a larger first end 704 to a smaller second end 706. The second end 706 of the flexible member 702 supports and lifts the vehicle cover 102.

Figure 7B:
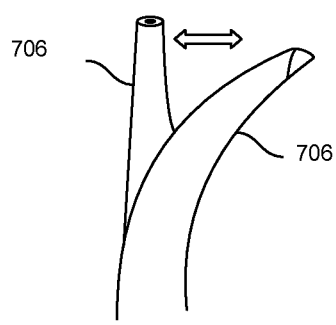
FIG. 7B is a perspective view showing flexing action of a portion of the flexible member of FIG. 7A.

FIG. 7B is a perspective view showing flexing action of a portion of the flexible member 702 of FIG. 7A. The flexing action resembles that of a metal tape measure of the type made of spring steel that reels into a housing. The familiar tape measure extends in a straight line and has a bowed or curved cross-section. The tape measure resists back-flexing towards the convex side of the tape measure, but flexes easily towards the concave side of the tape measure, and snaps back into a straight line when released. Similar to this action, the second end 706 of the flexible member 702 can be displaced from approximate linear alignment with the remainder of the flexible member 702, and will snap back into place when released.

Figure 8:
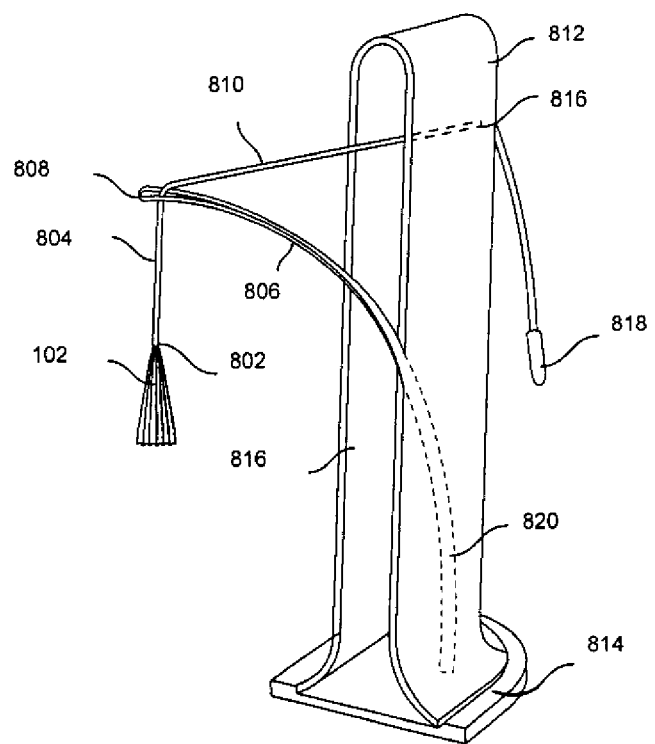
FIG. 8 is a perspective view of a further variation of the vehicle covering apparatus of FIG. 1, with a housing.

FIG. 8 is a perspective view of a further variation of the vehicle covering apparatus of FIG. 1, with a housing 812. The housing 812 could have a vehicle logo, a manufacturer's logo, a personalized name of an owner, advertising or other symbol or message on an outside or inside surface. Lighting of various types could be installed in or on the housing 812. The housing 812 has an open front 816. In the embodiment shown, the housing 812 has a base 814, which can be weighted. A first end 820 of a flexible member 806 is retained inside the housing 812. The second end 808 of the flexible member 806 moves into and out of the open front 816 of the housing 812.

Similar to other embodiments of the vehicle covering apparatus, the vehicle cover 102 can be raised or lowered by the second end 808 of the flexible member 806 or other support member in variations. In various embodiments, a raising mechanism applies tension to the second end of a tensioning member, such as a cord 810, so as to raise the vehicle cover 102 up from the vehicle. A raising mechanism could include a crank, a pull handle, a spring, a lever, or a counterweight etc. Here, a pull-cord 810 is attached at one end to the second end 808 of the flexible member 806 and has a handle 818 at the other end of the pull-cord 810. The pull-cord 810 passes through an aperture 816 positioned at a backside of the housing 812. Applying tension to the pull-cord 810, as by pulling on the handle 818 or by application of a crank, a motor or other mechanism, acts to decrease curvature of the flexible member 806 and pull the second end 808 of the flexible member 806 towards or into the interior of the housing 812. A cord 804 can be a separate piece of cord anchored to the second end 808 of the flexible member 806 in one embodiment, or can be an extension of the pull-cord 810 in a further embodiment.

Figure 9A:
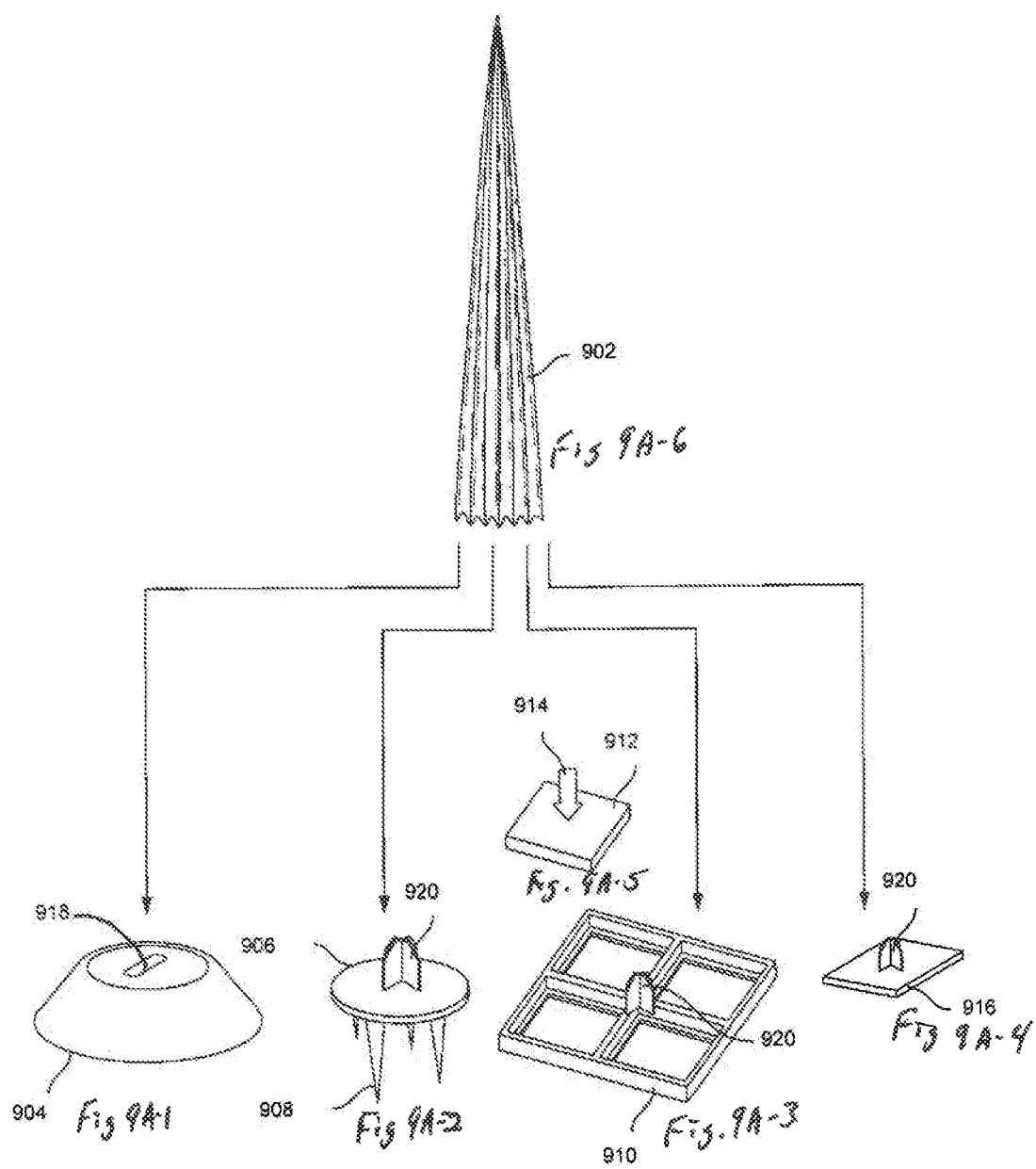
FIG. 9A is a perspective view of a variety of bases suitable for use with embodiments of the vehicle covering apparatus.

FIG. 9A is a perspective view of a variety of bases suitable for use with embodiments of the vehicle covering apparatus. A first end 902 of a support member of a vehicle covering apparatus is attached to a base by any of a variety of mechanisms. For example, the first end 902 of the support member could have a tab which fits into a slot 918. Or, the first end 902 of the support member could have a slot into which a prong 920 of a base fits, and the prongs could be various shapes. One base 904 is of a solid, dense material so that the base is weighted in and of itself. One base 906 has one or more spikes 908 which can anchor into the ground. A further base 910 has multiple compartments, and into each compartment a weight 912 is pressed with a downward force 914, forming a weighted base. One base 916 is boltable, as by inserting bolts through apertures in the base 916. Variations of these bases are readily devised.

Figure 9B:
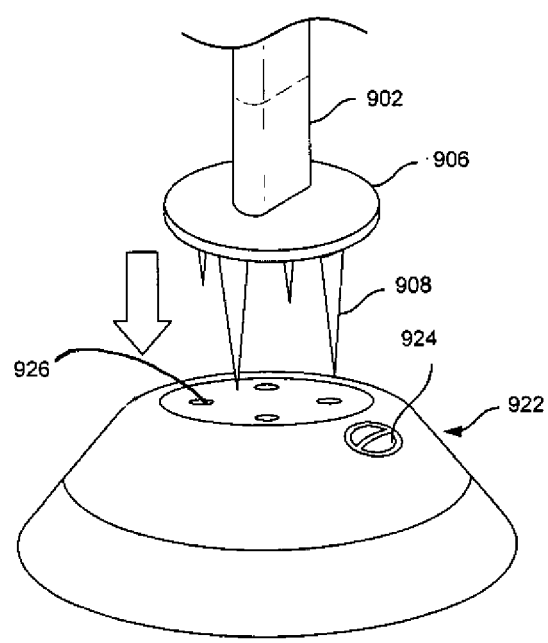
FIG. 9B is a perspective view of a further base suitable for use with embodiments of the vehicle covering apparatus.

FIG. 9B is a perspective view of a further base 922 suitable for use with embodiments of the vehicle covering apparatus. A plug 924 is removed from the base 922, exposing an inlet to the interior of the base, through which inlet sand or water could be poured, filling the base 922. The support member could be attached to the base 922 by any of a variety of mechanisms, such as bolts, screws, a clamp, adhesion, welding and so on. One attachment mechanism makes use of spikes 908 in a base 906 as shown in FIG. 9A. The spikes 908 would be inserted into apertures 926 in the base 922. This could be in lieu of adding water to the base 922, as water would likely leak out through these apertures 926. In such a case, the spikes could extend through the bottom of the base 922 and into the ground, providing additional support.

Figure 10A:
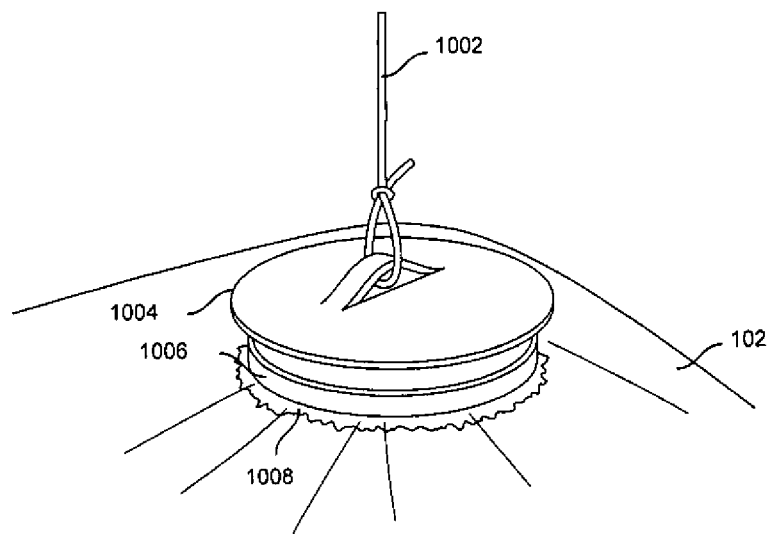
FIG. 10A is a perspective view of an embodiment of a cover retainer suitable for use with embodiments of the vehicle covering apparatus.

FIG. 10A is a perspective view of an embodiment of a cover retainer suitable for use with embodiments of the vehicle covering apparatus. The cover retainers shown in FIGS. 10A-10D, and other cover retainers, attach to a vehicle cover 102 and couple to the second end of the support member in embodiments of the vehicle covering apparatus so that the vehicle cover 102 can be lifted and lowered. For example, the cover retainer shown in FIG. 10A has a cord 1002 tied to the cover retainer, and this cord 1002 could be secured to the second end of a support member of a vehicle covering apparatus or could thread through eyelets or other routing devices on the support member.

In FIG. 10A, an attachment region of a vehicle cover 102 is trapped between a magnet 1006 and a plate 1004. In this embodiment, the plate 1004 is ferromagnetic, e.g., it can be attracted to a magnet. In a further embodiment, the plate 1004 could be a magnet, and the plate 1004 and the magnet 1006 could be arranged with magnet poles so as to attract each other. In a still further embodiment, the plate 1004 could be a magnet, and a ferromagnetic material could be used in place of the magnet 1006. In these embodiments, a magnet and a plate or two magnets trap the attachment region of the vehicle cover 102. Felt material 1008 or other non-scratch material is adhered to a face of the magnet facing away from the plate 1004, so that the surface of the vehicle roof is not scratched by the magnet 1006.

Figure 10B:
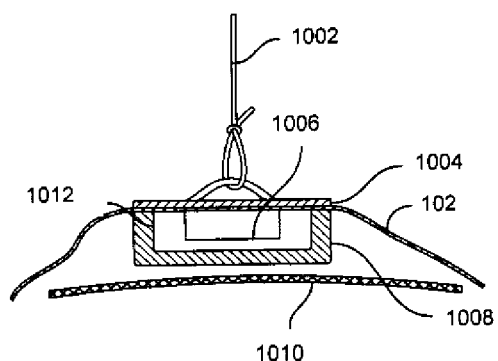
FIG. 10B is a cross-section view of the cover retainer of FIG. 10A.

FIG. 10B is a cross-section view of a variation of the cover retainer of FIG. 10A. The magnet 1006 is located in housing 1012 made of a plastic or other nonmagnetic material. A layer of felt 1008 covers some or all of the outer surfaces of the housing 1012. The vehicle cover 102 is trapped or pinched between the magnet 1006 and the plate 1004, or between the housing 1012 and the plate 1004. The housing 1012 is dimensioned so as to provide a gap between the magnet 1006 and the vehicle roof 1010. Then, when the cord 1002 pulls upward on the plate 1004, the magnet 1006 adheres to the plate 1004 with more force than exerted between the magnet 1006 and the vehicle roof 1010. So, the plate 1004 and magnet 1006 lift the vehicle cover 102 upward from the vehicle roof 1010, which could be steel. The gap and materials should be employed so that the magnet is not then retained by the roof 1010, which would prevent the vehicle covering apparatus from lifting the vehicle cover 102.

Figure 10C:
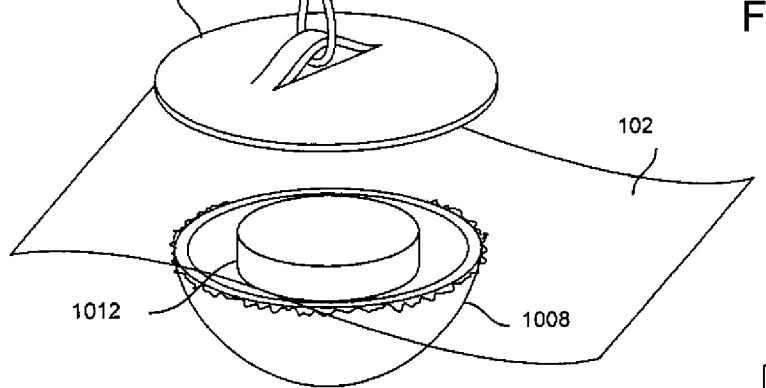
FIG. 10C is a perspective view of the cover retainer of FIG. 10A, with a magnet base separated from a top plate.

FIG. 10C is a perspective view of the cover retainer of FIG. 10A, with the housing 1012 separated from the top plate 1004. The housing 1012 includes a compartment or depression for the magnet 1006, and a plastic or other nonmagnetic material shell. Some or all of the shell is covered with felt 1008. A portion of a vehicle cover 102 is shown ready to be trapped between the plate 1004 and the housing 1012.

Figure 10D:
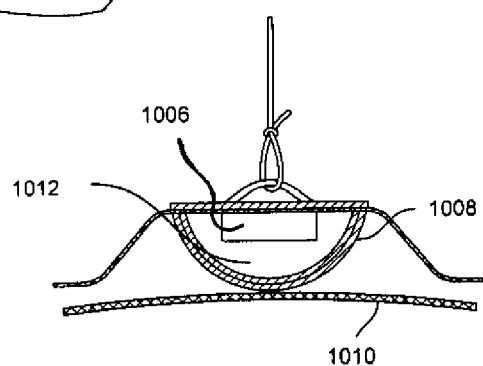
FIG. 10D is a cross-section view of a variation of the cover retainer of FIG. 10A.

FIG. 10D is a cross-section view of the cover retainer of FIG. 10C. The housing 1012 in this embodiment has a hemispherical shape, and includes a hollow or filled plastic shell with a magnet 1006 and felt covering 1008. The hemispherical shape of the housing 1012 provides a greater separation between the magnet 1006 and the roof 1010 of the vehicle, which reduces attraction between the magnet 1006 and the vehicle roof 1010.

Figure 11A:
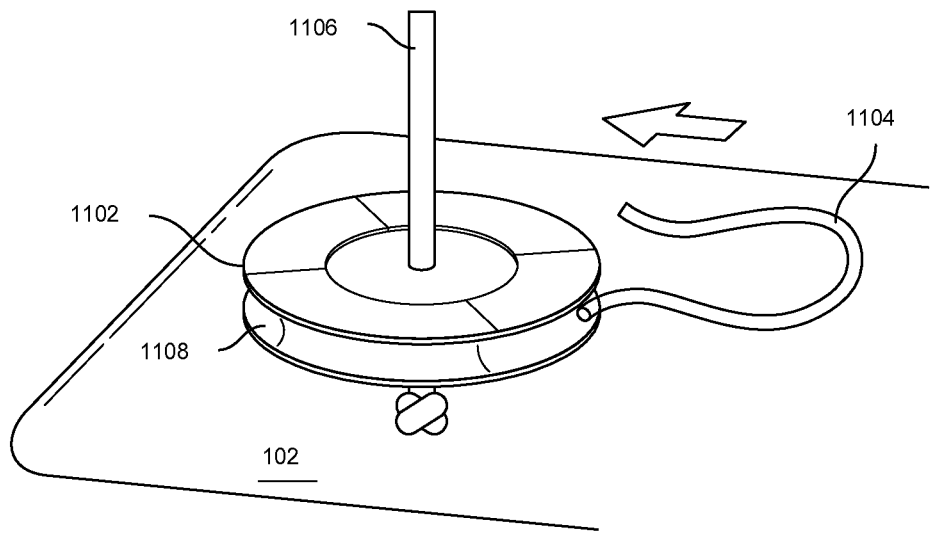
FIG. 11A is a further embodiment of a cover retainer suitable for use with embodiments of the vehicle covering apparatus.

FIG. 11A is a further embodiment of a cover retainer suitable for use with embodiments of the vehicle covering apparatus. This cover retainer includes a grooved puck 1102 and a slide clip 1104. The puck 1102 is pressed downward into the attachment region of the vehicle cover 102, and the clip is installed into a groove 1108 of the puck 1102 from beneath the vehicle cover 102, i.e., from a side of the vehicle cover opposing the side into which the puck 1102 is pressed.

Figure 11B:
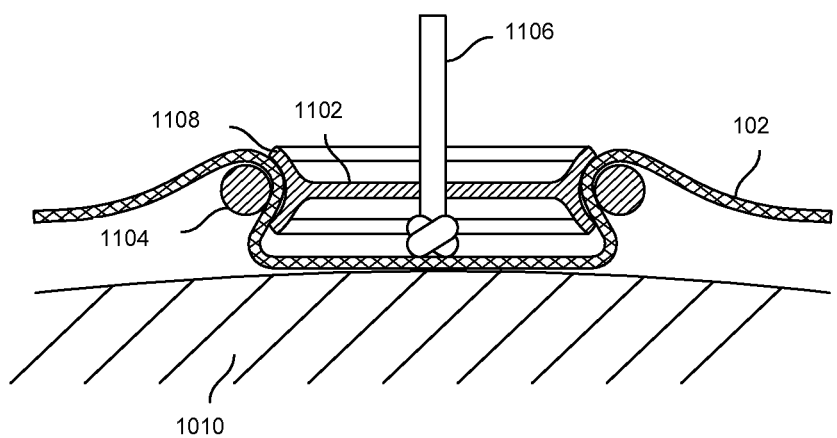
FIG. 11B is a cross-section view of the cover retainer of FIG. 11A.

FIG. 11B is a cross-section view of the cover retainer of FIG. 11A. The vehicle cover 102 is trapped between the clip 1104 and the puck 1102. The clip 1104 presses a portion of the vehicle cover 102 into the groove 1108 of the puck 1102. A cord 1106 passes through an aperture in the puck 1102. The cord 1106 has a knot securing the cord 1106 to the puck 1102. In a further embodiment, an elastic member, e.g., a rubber band, a bungee cord or an elastic loop, could replace the clip 1104.

FIG. 12A is a perspective view of an embodiment of a securing member 1202, which can be applied to gather and secure portions of a vehicle cover 102 in embodiments of the vehicle covering apparatus. In this embodiment, the securing member 1202 has multiple rollers 1206 arranged in an array which could be circular, oval or polyhedral for example. A first cord 1208 is shown holding onto a portion of a vehicle cover 102 or holding onto a cover retainer. A second cord 1210 is attached to the securing member 1202, and can be used to pull the securing member 1202 onto and off of the vehicle cover 102. The rollers 1206 in one embodiment are similar to beads threaded onto a circular bracelet, such that each of the rollers spins or rolls about a longitudinal axis, and the longitudinal axes of the rollers are arranged in a polygon or a ring.

FIG. 12B is a perspective view of a further embodiment of the securing member 1204, shown gathering and securing a vehicle cover. The securing member 1204 is a ring, and includes an aperture through which a portion of the vehicle cover 102 can pass. The securing member 1204 has a generally toroidal body, and could have an outer profile that is circular, oval, polygonal or of mixed curved and straight segments or other shapes for example. The securing member 1204 could be made of or coated with a non-stick material, such as nylon, Teflon or various types of plastic, or could be made of metal, ceramic, or composite material. A smooth finish for the securing member 1204 prevents the vehicle cover 102 from snagging on securing member, although other textured finishes could be used. The securing member 1204 is shown at an initial position in the upper half of FIG. 12B, prior to gathering and securing the vehicle cover 102. The securing member 1204 is also shown in the lower half of FIG. 12B at a secured position, in which the vehicle cover 102 is gathered and secured by the securing member 1204.

There are at least two ways of applying the securing member 1202, 1204 and variations thereof. In a first scenario, an attachment region of the vehicle cover 102 passes through the aperture of the securing member 1202, 1204, followed by a further portion of the vehicle cover 102 passing through the aperture, as the securing member 1202, 1204 secures the vehicle cover 102. In a second scenario, the securing member 1202, 1204 moves from the attachment region of the vehicle cover 102 to a location farther along the gathered vehicle cover 102, with the securing member 1202, 1204 gathering the vehicle cover as the securing member moves. Removing the securing member 1202, 1204 from the vehicle cover 102 is a matter of reversing the motion of the securing member 1202, 1204 and/or the motion of the vehicle cover 102 relative to the securing member 1202, 1204.

FIG. 12C is a perspective view of the securing member 1204 of FIG. 12B, showing aspects of an operating feature. A flexible member 616, as shown in FIG. 6, or other version of the support member of a vehicle covering apparatus, holds the vehicle cover 102, with the support member in the first position as previously described. In order to pull the securing member 1204 from the initial position to the secured position, tension is applied to the second cord 1210, which attaches to the securing member 1204. The cord 1210 is attached to the support member such that the cord 1202 is movable or slidable relative to the support member, or removable from the support member. For example, the cord 1210 could be attached to the support member through an eyelet, a hook, an aperture, a cleat etc.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A vehicle covering apparatus, comprising:
a support member having a first end and a second end, the support member having a first position and a second position, wherein the second end is more displaced from a linear alignment with the first end when the support member is in the second position than when the support member is in the first position, and wherein the second end is farther from the first end when the support member is in the first position than when the support member is in the second position;
the support member configured to install with the first end of the support member adjacent to a vehicle, wherein the second end of the support member is substantially centered over the vehicle when the support member is in the second position;
the second end of the support member configured to support a vehicle cover with the second end of the support member at a higher elevation than the vehicle cover; and
the support member configured to lower the vehicle cover as the support member is operated from the first position to the second position, and to raise the vehicle cover as the support member is operated from the second position to the first position, wherein the support member elastically bends between the first position and the second position.

2. The apparatus of claim 1, further comprising:
a base configured to retain the first end of the support member, the base having sufficient weight and extent so as to support the support member in the first position and in the second position.

3. The apparatus of claim 1, further comprising:
an anchor member configured to attach to the support member at the first end of the support member, the anchor member including one from a set consisting of: a weighted base, a water-fillable base, a sand-fillable base, a boltable base, one or more spikes, a base having a plurality of horizontal members each extending from the first end of the support member, and a housing having a base.

4. The apparatus of claim 1, wherein the support member includes a pivot positioned between the first end and the second end, such that the second end pivots relative to the first end.

5. An apparatus for raising and lowering a vehicle cover, comprising:
- a flexible member having a first end and a second end, the flexible member configured to flex so that, with the first end positioned adjacent to a vehicle and the second and positioned higher than the vehicle, the second end raises the vehicle cover up from the vehicle and lowers the vehicle cover down towards the vehicle; and
- the second end of the flexible member configured to retain the vehicle cover, wherein the flexible member flexes between a first position and a second position as the second end raises and lowers the vehicle cover.

6. The apparatus of claim 5, further comprising:
the first end of the flexible member having an anchor mechanism configured to retain the first end of the flexible member adjacent to the vehicle.

7. The apparatus of claim 5, further comprising:
a base; and
a housing, attached to the base, the housing having an open front, wherein the first end of the flexible member is retained inside the housing and the second end of the flexible member moves into and out of the open front of the housing.

8. The apparatus of claim 5, further comprising:
a cord, attached to the second end of the flexible member; and
a housing, configured so that pulling on the cord results in the second end of the flexible member moving into the housing and releasing the cord permits the second end of the flexible member to move out of the housing.

9. The apparatus of claim 5, further comprising:
a tensioning member having a first end and a second end, the first end of the tensioning member attached to the second end of the flexible member; and
a raising mechanism configured to apply tension to the second end of the tensioning member so as to raise the vehicle cover up from the vehicle, the raising mechanism including one from a set consisting of: a crank, a pull handle, a spring, a lever, and a counterweight.

* * * * *